Sept. 16, 1941.  R. P. REDMOND  2,256,036
MATRIX OR MOLD APPARATUS AND METHOD OF MAKING SAME
Filed Dec. 13, 1938  2 Sheets-Sheet 1

Inventor,
RUFUS P. REDMOND,
By Baldwin & Wight
HIS Attorneys,

Sept. 16, 1941.　　　R. P. REDMOND　　　2,256,036
MATRIX OR MOLD APPARATUS AND METHOD OF MAKING SAME
Filed Dec. 13, 1938　　　2 Sheets-Sheet 2
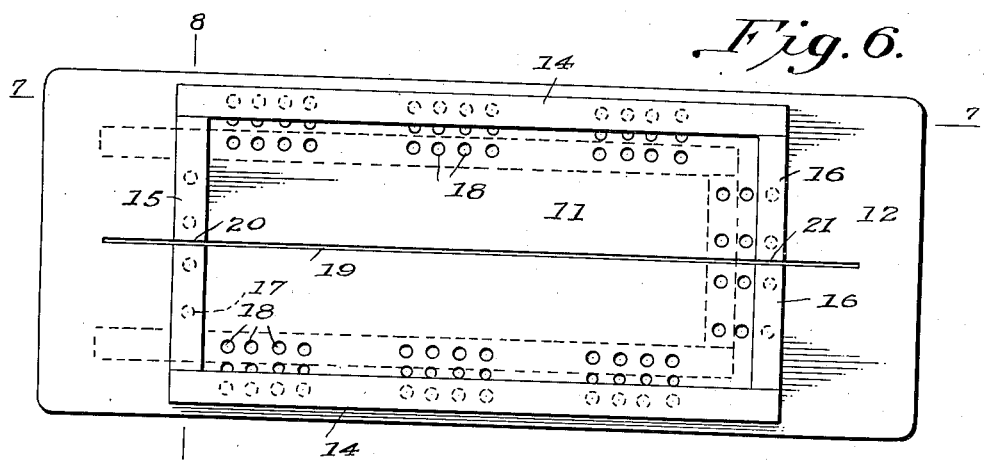
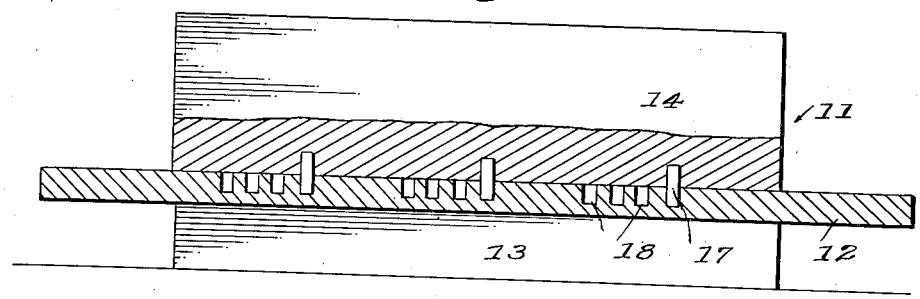
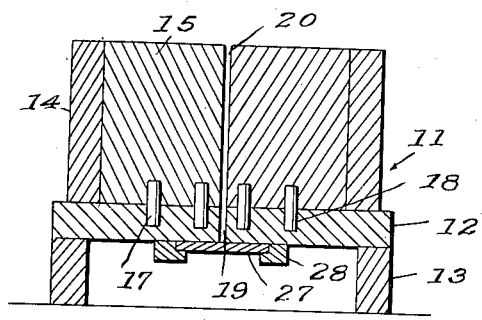 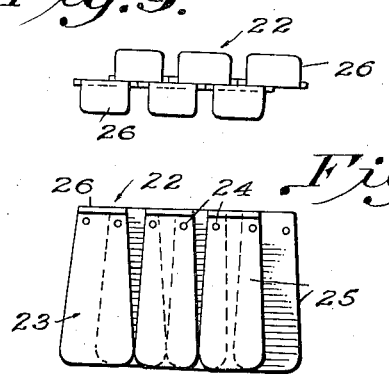
Inventor,
RUFUS P. REDMOND,
By Baldwin & Wight
HIS Attorneys, Patented Sept. 16, 1941

2,256,036

UNITED STATES PATENT OFFICE 2,256,036

MATRIX OR MOLD APPARATUS AND METHOD OF MAKING SAME

Rufus P. Redmond, Saratoga Springs, N. Y.

Application December 13, 1938, Serial No. 245,474

11 Claims. (Cl. 18—44)

This invention relates to a matrix or mold apparatus and method, more especially for use by chiropodists, in shoe stores and elsewhere, in producing casts from which lasts may be made as exact human foot replicas to facilitate and insure the making of accurately fitting shoes.

A prime object is to provide a means and method whereby the mold or matrix may be cast in non-integral or separate, collectively mating sections or parts which disassociate of themselves when disengaged with the foot, and thus avoid the necessity of breaking one section or part from another and the risk of fracture incident thereto.

Another important object is to provide a means and method whereby the integration of the mold is avoided, especially beneath the foot.

A further important object is to provide a divider or parting strip for the mold sections which is conformable to the contour of the foot and is initially supported in a manner to enable disposition of plastic material beneath leaves thereof, the plastic material being capable of thereafter supporting the parting strip as it is adjusted in conformity to the curvature of the foot.

A still further object is to provide the aforesaid divider or parting strip in a length of flexibly connected elements having laterally extending leaves to coact with the plastic material in supporting and positioning the strip.

Still another object is to provide a novel mold box or receptacle with a slot or slots coacting with the divider or parting strip.

The more specific objects and advantages will become apparent from a consideration of the following description, taken in connection with accompanying drawings which illustrate, by way of example, an operative embodiment of the invention.

In the drawings:

Figure 6 is a plan view of the mold structure with the divider or parting strip removed;

Figure 7 is a longitudinal section taken on the plane of line 7—7 of Figure 6;

Figure 8 is a cross section taken on the plane of line 8—8 of Figure 6;

Figure 9 is a fragmentary top or plan view of the divider or parting strip; and

Figure 10 is a fragmentary side elevation of said divider or parting strip.

Figure 1:
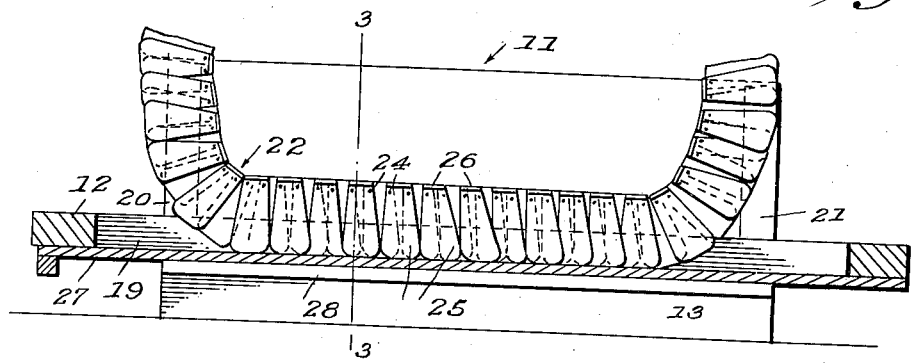
Figure 1 is a view in central, longitudinal section through the mold structure of my invention.

Referring specifically to the drawings, wherein like reference characters designate like or corresponding parts throughout the different views, 11 designates generally a mold box or receptacle, being of any desired size, shape, and material. For example, it may be constructed of wood. Such receptacle has a base 12 which is preferably elevated by risers 13. On the base, two side panels 14, two toe panels 15, and two heel end panels 16 are arranged to accommodate a body of material in a plastic condition, usually plaster of Paris as at P. The panels 14, 15, and 16 may be of any appropriate height according to the size of the last in view, and may even consist of superposed, separable sections. In order to accommodate the apparatus for all sizes of feet, the panels 14, 15, and 16 are separable from the base and are adjustably positioned thereon, as by the engagement of dowels or pegs 17 carried by the panels with sockets or recesses 18 in the upper surface of the base. Usually, the panels 14, 15, and 16 are provided in pluralities of different lengths or sizes so that substitutions may be made to the extent permitted by the sockets or recesses 18, depending on the size of the space desired for molding.

Extending centrally through the base 12 and beyond the end panels is an elongated vertical slot 19. Aligned and registering with slot 19 are slots or spaces 20 and 21 provided by spacing the toe and heel end panels 15 and 16, respectively, apart.

Coacting with the slots 19, 20, and 21 is a mold divider or parting strip 22. As shown, parting strip 22 comprises a multiplicity of thin hardened steel or other blades or sections 23 of L-shape, flexibly connected or pivoted together as at 24. The sections 23 provide leaves or wings 25 which substantially fill and are movable in the slots 19, 20, and 21, and are materially longer than the depth of the slots, and they further provide lateral leaves or flanges 26 extending alternately in opposite directions.

In the receptacle, the plaster of Paris P or equivalent in plastic condition is disposed in the quantity desired. In order to hold the intermediate portion of the divider or parting strip with the leaves 25 raised above the base so that the plastic material P may be disposed thereunder, a supporting strip 27 is disposable beneath slot 19. Strip 27 is removably and slidably mounted by cleats 28 on the inner surfaces of the risers 13.

Figure 5:
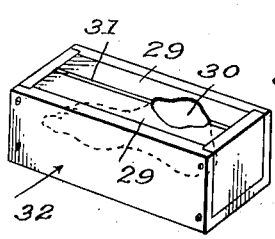
Figure 5 is a detail perspective view showing a boxed mold as produced in accordance with the invention.

The apparatus is used primarily by chiropodists in the store, office, or elsewhere to prepare a mold in two mating, separate sections 29, as shown in Figure 5, jointly having a cavity 30 therein for the casting of a last in exact replica of the human foot, for transmission to a shoe factory for use in making accurately fitting shoes. One of the meeting faces of one section 29 may have a gasket 31 of pasteboard, felt, or other material secured thereto with a suitable adhesive. Both sections 29 may be conveniently disposed in a box or receptacle 32.

Figure 2:
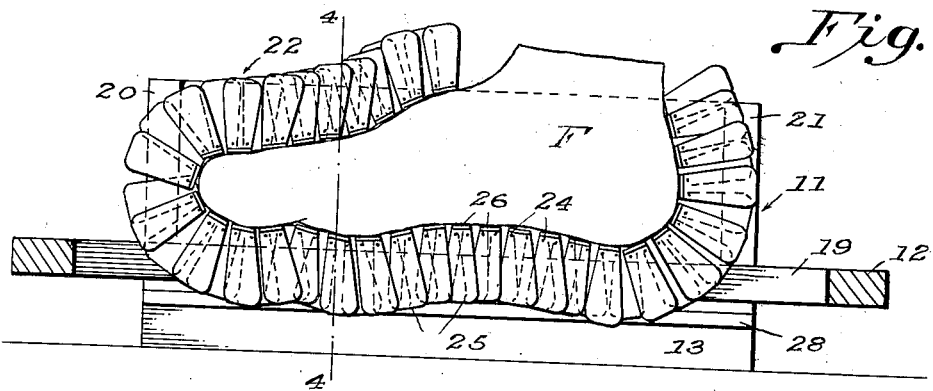
Figure 2 is also a view in central, longitudinal section but showing the same in use, producing a mold of a foot.
Figure 3:
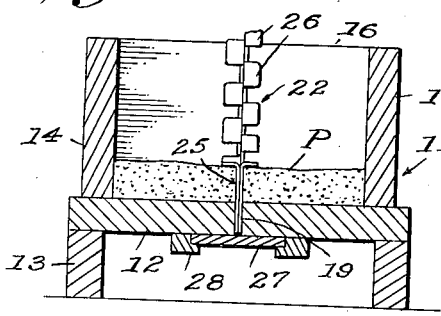
Figure 3 is a vertical section taken on the plane of line 3—3 of Figure 1.
Figure 4:
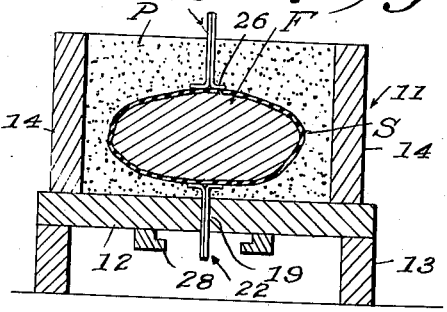
Figure 4 is a vertical section taken on the plane of line 4—4 of Figure 2.

In using the apparatus and method, a mold such as is shown in Figure 5 is made for each foot to be accurately fitted with a shoe. Initially, the parts are in the form shown in Figure 1 where strip or slide 27 supports the divider or parting strip with leaves 25 raised above the base 12. At this stage, the foot as at F is covered with a thin elastic sock. This sock, the divider 22, upper surface of base 12 within the box, and inner surfaces of panels 14, 15, and 16—that is, all surfaces to contact with the plastic material—are covered with a material to which the plastic material will not adhere, for instance, vaseline. Thereupon, the box is filled with the plaster of Paris or equivalent to a height contacting the under surface of the horizontal leaves 25. Such plaster of Paris will support and sustain the divider in this position, so that the slide or strip 27 may be removed. The plaster of Paris in plastic condition will displace or yield as the foot is placed in contact with the leaves 25, so that the parting strip beneath the foot will assume the shape shown in Figure 2, conforming to the contour of the foot. At the same time, more plaster of Paris is added to the mold, and the terminal portions of the parting strip are pressed into contact with the heel to the height desired and with the upper portion of the toes and foot, the plaster of Paris maintaining the parting strip in proper position. It will be noted that the blades 23 completely bridge the space between the foot and the slots, and hence the plaster of Paris, when set, forms a mold in two separate parts or sections, which will separate or fall apart when the mold is disassembled. Imperfections in the sections 29 thus produced may be repaired with plaster of Paris, as at the surfaces engaged by the parting strip, and at one of the surfaces the space occupied by the parting strip is compensated for by the addition of the gasket 31. Such mold may be assembled in a box as in Figure 5 and a last cast in the cavity 30, which last may be transmitted to a shoemaker or factory so that an accurately fitting shoe may be made.

Various changes may be resorted to provided they fall within the spirit and scope of the invention as defined by appended claims.

I claim:

1. In the making of a foot last mold from a body in plastic condition having a parting strip therein, positioning the parting strip within the plastic body, and thereafter pressing the foot against the parting strip to conform the parting strip to the contour of the adjacent portion of the foot counter to the action of the plastic body.

2. In the method of making a mold from a plastic body disposed in contact with an object having a flexible parting strip therein having laterally extending leaves, positioning said strip in contact with the adjacent portion of the object while the strip is sustained by the plastic body engaging said laterally extending leaves from below.

3. In the method of making a mold from a plastic body having a flexible parting strip therein while contained in a receptacle having an elongated slot in its base, sustaining the strip while in said slot so as to project above the slot, disposing the object in contact with the body and strip, and pressing the object against the strip to flex the strip and conform the same and plastic body to the shape of the adjacent portion of the object.

4. A mold structure having a receptacle for material in plastic condition and an object engaged therewith, said receptacle having an elongated slot, a flexible parting strip operable in said slot of greater relative dimension than the depth of the slot, and laterally extending means on said strip and within said receptacle for contacting the plastic material, and by such contact supporting the strip in the slot with the inner edge of the strip sustained within the receptacle in spaced relation to the slot.

5. A mold structure according to claim 4 wherein said strip comprises a multiplicity of sections, elements pivotally connecting the sections together, said elements being relatively close to the laterally extending means.

6. A mold structure according to claim 4 wherein said strip comprises a multiplicity of sections, elements pivotally connecting the sections together, and said laterally extending means comprising elements extending in different directions.

7. A mold structure according to claim 4 having said slot in a bottom wall, riser means depending from said wall, and a displaceable part on the lower surface of the bottom wall constituting means to sustain the strip in spaced relation to the slot.

8. A mold structure having a base wall provided with an upstanding elongated slot, walls rising from said base to form a receptacle being spaced apart to form slots in registry with the first mentioned slot, a parting strip comprising sections of a dimension corresponding to the depth of the slots greater than such depth, means pivotally connecting the sections together, and means carried by the sections within the receptacle adapted for engagement by plastic material to support the sections, while conforming the sections to the contour of an object coacting with the plastic material.

9. A mold structure having a base wall provided with an upstanding elongated slot, walls rising from said base to form a receptacle being spaced apart to form slots in registry with the first mentioned slot, means for adjustably connecting the walls to the base, a parting strip having sections of a dimension corresponding to the depth of the slots greater than such depth, laterally extending elements in different directions on said sections adapted for engagement by plastic material to support the sections while conforming the sections to the contour of a foot coacting with the flexible material, and means flexibly connecting the sections together.

10. In a mold structure, a receptacle having a base wall provided with an elongated vertical slot; a parting strip positioned in said slot and being of a width to extend substantially to the bottom of the slot and above the base wall, said strip being flexible in the plane of the slot; and means adapted to be removably positioned under the slot for engaging the bottom edge of the parting strip for releasably holding it up in the slot with the upper edge of the strip spaced above the base wall.

11. Mold structure as set forth in claim 10 in which the upper edge of the parting strip is provided with laterally extending flange means adapted to contact plastic material in the receptacle and yieldably support the parting strip.

RUFUS P. REDMOND.